June 30, 1959  R. H. COOPER  2,892,379
PNEUMATIC FILM TRANSPORT
Filed April 20, 1955  6 Sheets-Sheet 1

INVENTOR:
ROBERT H. COOPER
BY W.R. Maltby
K. W. Wonnell
ATT'YS

June 30, 1959 R. H. COOPER 2,892,379
PNEUMATIC FILM TRANSPORT
Filed April 20, 1955 6 Sheets-Sheet 3

BLOCK DIAGRAM
OF MAGAZINE CONTROLS

INVENTOR:
ROBERT H. COOPER
BY W.R. Maltby
K.W. Wonnell
ATT'YS

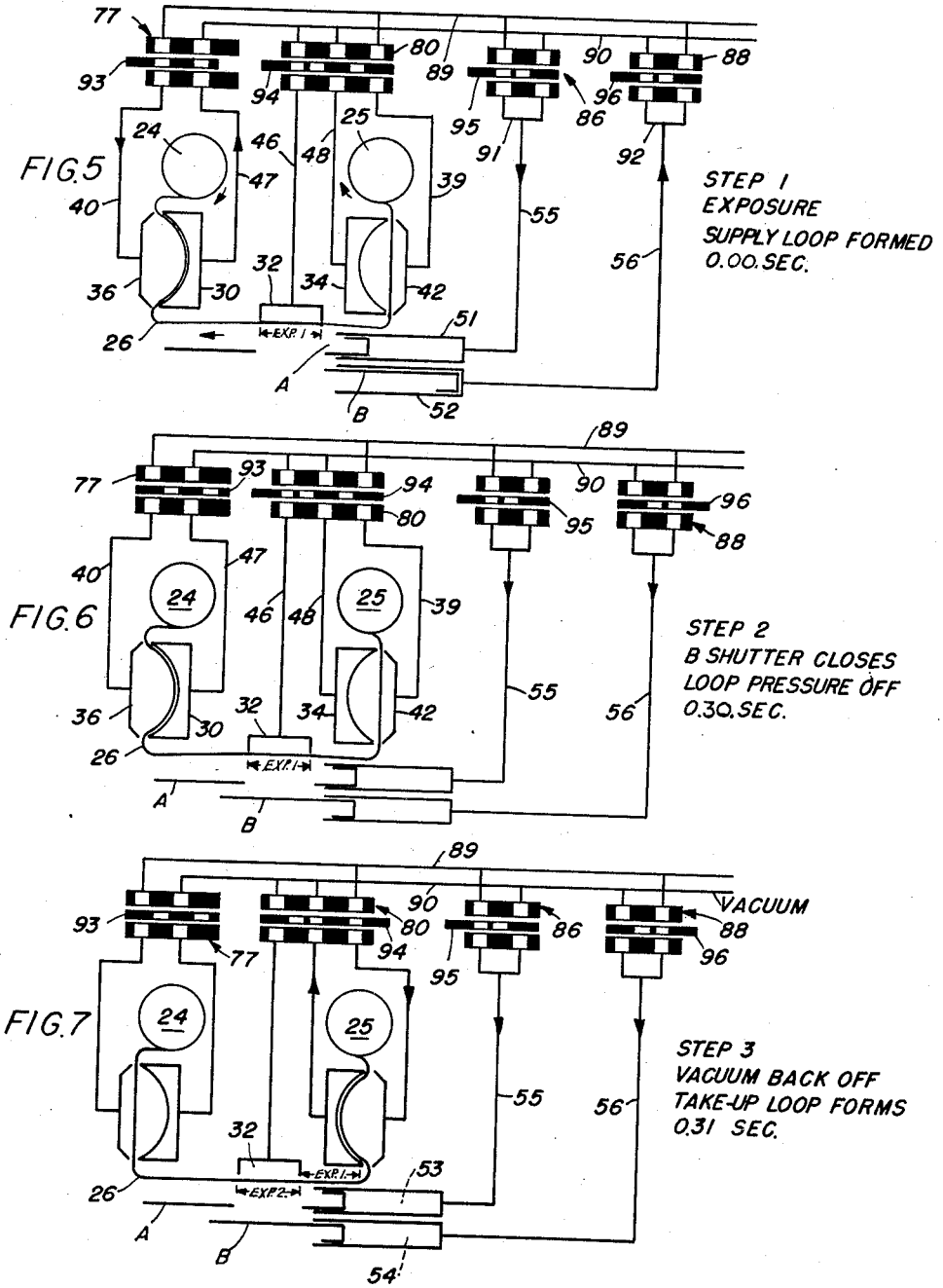

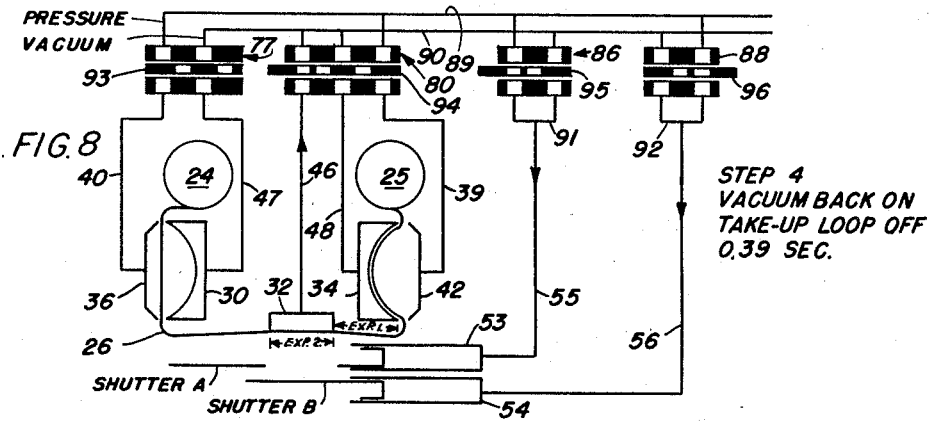
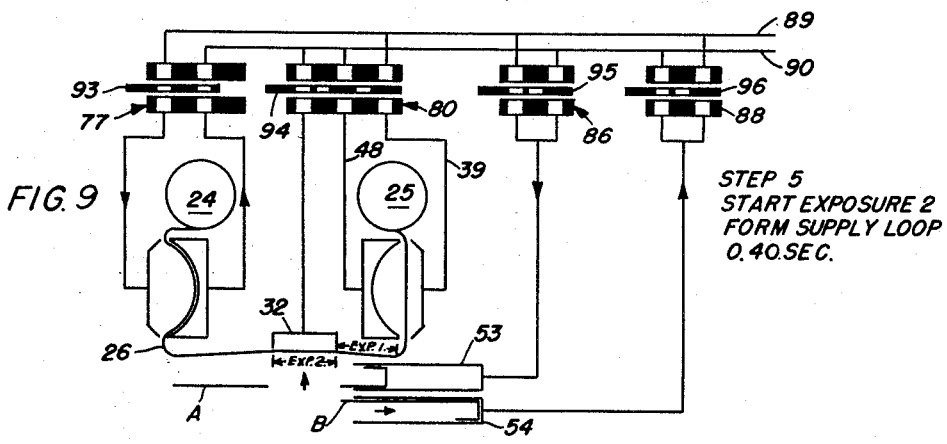
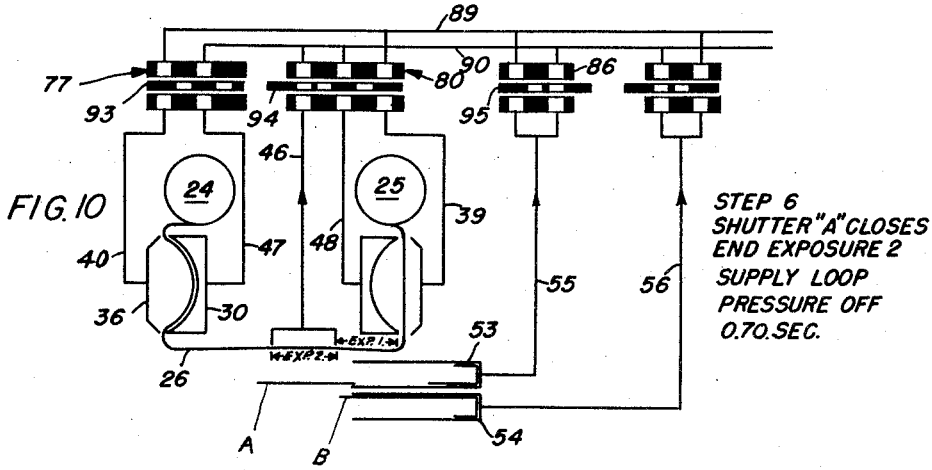

June 30, 1959 R. H. COOPER 2,892,379
PNEUMATIC FILM TRANSPORT
Filed April 20, 1955 6 Sheets-Sheet 6

STEP 7
TAKE-UP LOOP FORMS
EXPOSURE 3 IN PLACE
VACUUM BACK OFF
0.71 SEC.

STEP 8
VACUUM BACK-ON
TAKE-UP LOOP OFF
0.79 SEC.

INVENTOR:
ROBERT H. COOPER
BY
ATT'YS.

United States Patent Office 2,892,379
Patented June 30, 1959

2,892,379

PNEUMATIC FILM TRANSPORT

Robert H. Cooper, Boulder, Colo., assignor, by mesne assignments, to the United States of America as represented by the Secretary of the Navy Application April 20, 1955, Serial No. 502,755

3 Claims. (Cl. 88—18)

This invention relates in general to a pneumatic apparatus for moving flexible strip material and is more particularly described as a pneumatic feeder for moving a continuous roll of aerographic film for an eclipse camera in relatively short metered steps. This mechanism may be applied in general to the movement of any flexible sheet material by the successive advancing of predetermined lengths of film. For use in a camera, a transport cycle includes the closing of the exposure shutters, the release movement and the engagement of the film, and the opening of the shutters in exposure times ranging from 0.3 sec. to 3 sec.

Important objects of the invention when included in a camera for eclipse use are the consistency and reliability of operation, handling of the film without scratching or other damage, uniformity of exposure time over each exposure area, and placement of the film in exact focus.

A further object of the invention is to provide a simple operating pneumatic mechanism in which the only rapidly moving parts are the film strip and the air-projected shutters, eliminating gears, cams, and other moving mechanisms.

A still further object of the invention is to provide a reliable apparatus in which nearly all mechanism is eliminated except simple valves and solenoids or operating, reciprocating, gearless components.

A still further object of the invention is to produce an economical apparatus which requires no close tolerances in the movable parts thereby eliminating maintenance and construction costs.

Still a further object of the invention when applied to a camera is the attachment of a shutter, plate or screen directly to a sliding piston pneumatically actuated.

A still further object of the invention is to provide a feeding and take-up mechanism actuated by pneumatic pressure and vacuum.

A further object of the invention is to provide means for adjusting the metered length of the film or strip which is fed at each step.

Other objects of the invention will appear in the specification and will be apparent from the accompanying drawings, in which.

Figures 13, 14, 15:
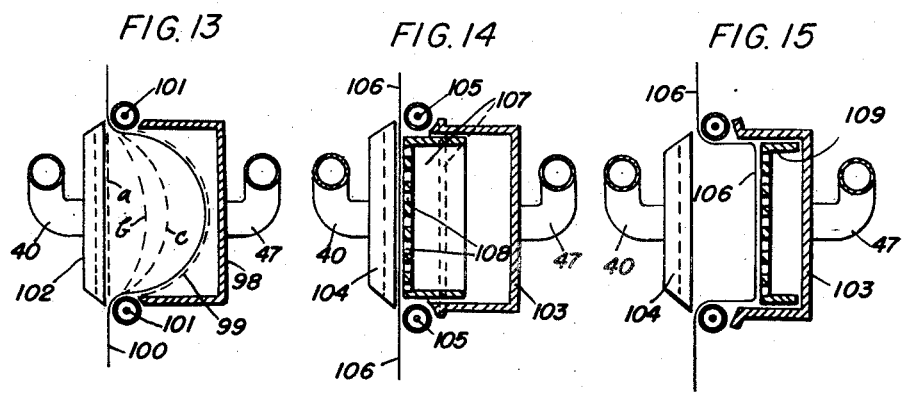

Figs. 5 to 12 inclusive are diagrammatic views illustrating the positions and connections of the valves, shutters, supply- and take-up-forming chambers in the various steps positions for a complete cycle of operations of the film-transport apparatus;

Fig. 13 is a sectional view illustrating one means for varying the metered length of a curved section of a film which is fed at each step; and Figs. 14 and 15 are sectional views illustrating means for varying the metered length of a film in an angular or rectangular contour.

This invention will be described as incorporated in a pneumatic film feeder which required exposures on a continuous roll of film 9.5 in. wide, and this film should be transported 1.75 in. between exposures in 0.1 sec. employing a pair of shutters, each directly connected to a sliding piston and adopting a particular sequence. The shutter which ends an exposure always moves across the film aperture in the same direction as the shutter that began that exposure, so that if both shutters move at the same speed, every point on the film is exposed for the same duration.

Referring now more particularly to the drawings, the camera comprises a light-tight enclosure 20 which may be in the form of a box with slidable panels 21 and 22 for free access to the interior having headed screws 23 for releasably fastening the panels in place.

Figure 2:
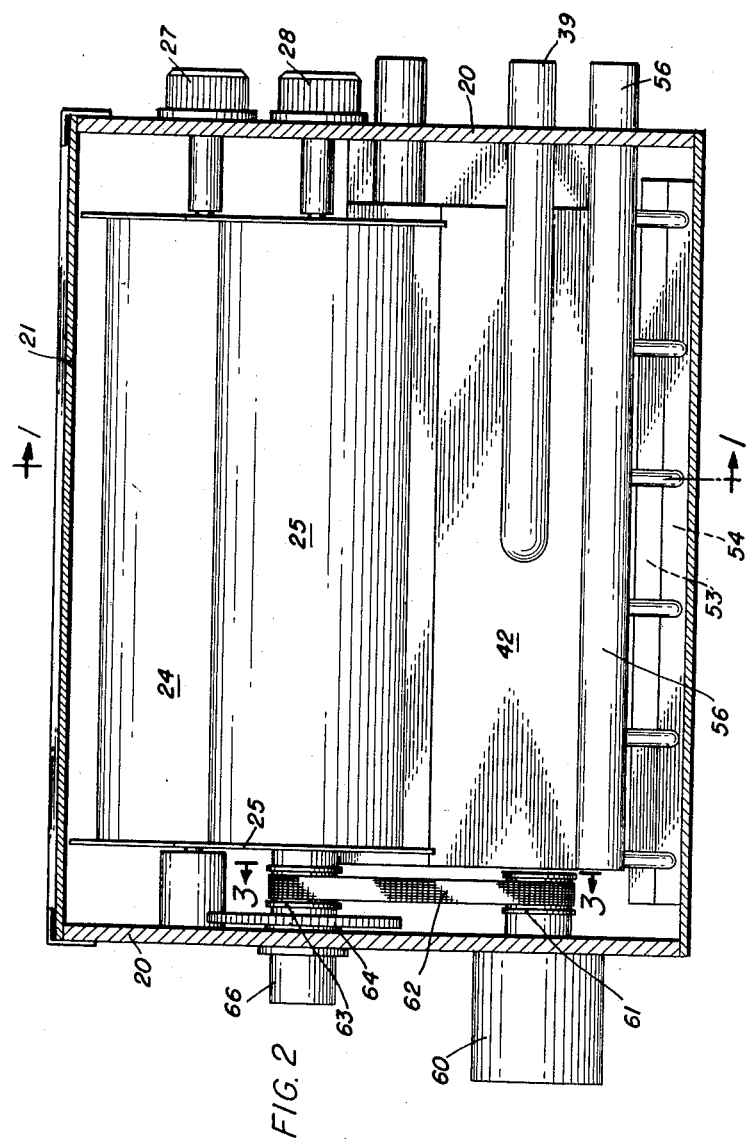
Fig. 2 is an elevational view of the inside of the camera as taken on the line 2—2 of Fig. 1.

Within the box or enclosure are a supply reel 24 and a take-up reel 25 suitably mounted at their ends and operative to discharge a strip of light-sensitive film 26 from the supply reel and to wind it upon the take-up reel. These reels are suitably mounted upon shafts as shown in Fig. 2 which have knobs 27 and 28, respectively, at the outside of the container 20 for separately winding or adjusting the reels as desired.

The strip of film 26 to be exposed passes over a plurality of guide idler rollers 29 at opposite sides of a loop-forming device 30, around an idler roller 31 for guiding the film over a vacuum backing device 32 and over idler rollers 33 at opposite sides of the loop take-up device 34 and thence around the take-up roller 25.

In the loop-forming device 30 is an arcuate guide 35 between the rollers 29, and outside of the rollers spanning the distance between them is an air pressure receptacle 36 with openings 37 opposite the film between the rollers and with projections 38 extending adjacent the rollers between which the film passes. Connected to the air pressure supply receptacle 36 is an air pressure pipe 40.

In the loop take-up device 34 is an arcuate guide 41 which forms a backing for the film 26 within the take-up device, and at the outside spanning the rollers 33 is an air pressure receptacle 42 with openings 43 opposite the film which passes between projections 44 and the adjacent rollers 33. Connected to the receptacle 42 is an air pressure pipe 39 which supplies air under pressure at the outside of the film 26 relatively to the take-up device 34. The backing device 32 provides a flat back-up grid 45 against which that portion of the film to be exposed may be drawn by suction from a vacuum tube 46. A vacuum tube 47 extends from the inside of the loop-forming device 30 for connection to a suitable source of vacuum and a similar tube 48 extends from the inside of the loop take-up device 34 for connection to a suitable source of vacuum through controlling valves as described later.

In the wall of the camera box 20 opposite the back-up grid 45 is an exposure aperture 50, and similarly apertured plates between said wall and the grid 45 alternate with shutters A and B movable by pistons 51 and 52, respectively. The pistons are slidably movable in the chambers of receptacles 53 and 54, respectively, which are each connected by a plurality of short pipes to tubes 55 and 56, respectively. The shutter A has a perforation 57 intermediate its ends which corresponds in size to the aperture 50 when the shutter is in its outermost position, but the shutter B has no such opening and entirely clears the exposure aperture when the shutter is drawn by its piston 52 to the innermost end of its stroke. Both of the shutters are actuated in opposite directions by their pistons 51 and 52, depending upon whether suction or pressure is applied to their tubes 55 and 56.

Figure 3:
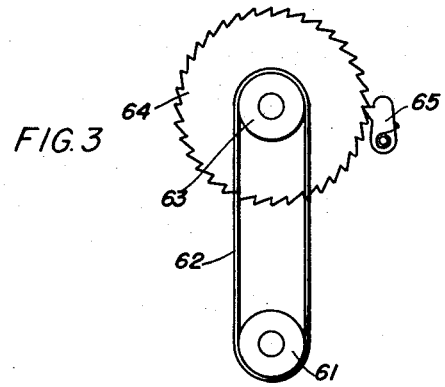
Fig. 3 is an elevational view of the take-up mechanism as taken on the line 3—3 of Fig. 2.

A suitable driving connection for winding the film 26 upon a take-up reel 25 consists of a continuously driven motor 60 (Fig. 2) at the outside of the camera box having a pulley 61 at the inside engaged by a belt 62 which passes over a pulley 63 connected at one end of the take-up reel 25. To this latter pulley is connected a ratchet gear 64 having teeth which are engaged by a pawl 65 (Fig. 3) arranged so that there is no rearward movement of the film 26. At the outside of the container 29 is a bearing housing 66 for the shaft of the take-up reel 25.

Figure 4:
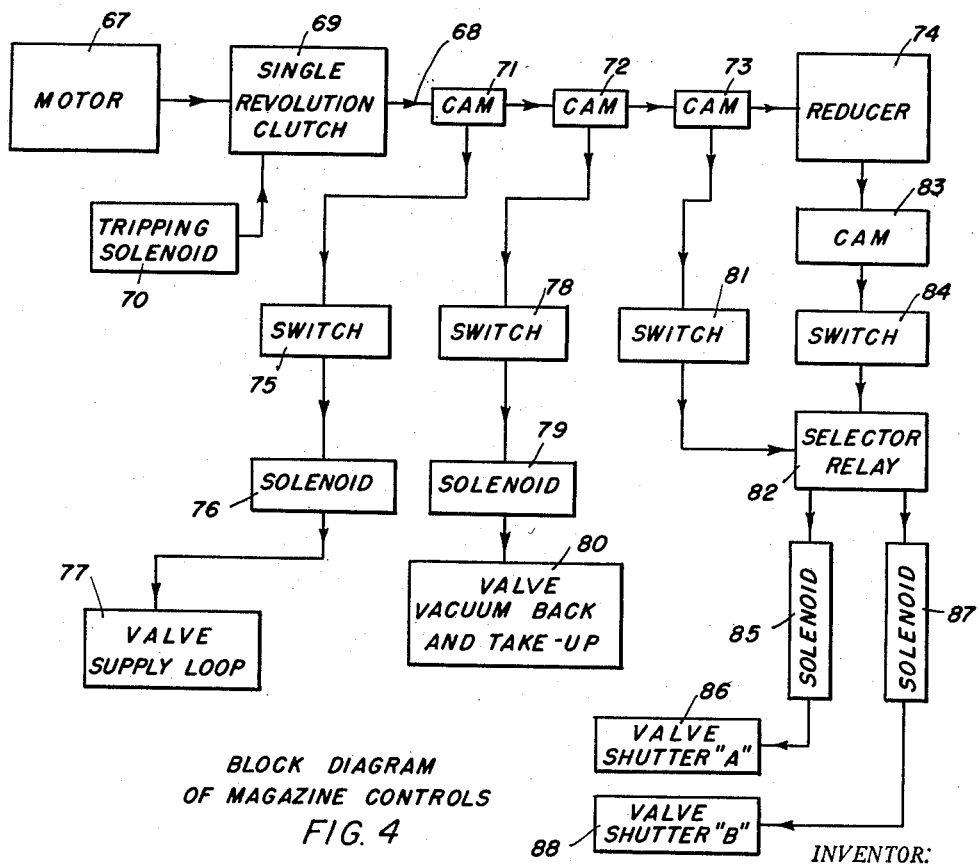
Fig. 4 is a block diagram of the control mechanism for the camera.

The film is advanced in a step-by-step manner by the operating means shown in Fig. 4 and in the sequence shown in Figs. 5 to 12 inclusive.

In the operating controls, a continuously rotating motor 67 may be connected to a shaft 68 through a single revolution clutch 69 controlled by a tripping solenoid 70. On the shaft are cams 71, 72 and 73, and connected to the shaft is a speed reducer 74. One of the cams, as 71, may control a switch 75 for a solenoid 76 for operating a valve 77 for the loop-forming device 30. Another cam 72 operates a switch 78 for controlling a solenoid 79, which operates a valve 80 for the vacuum backing device 32 and also for the loop take-up device 34. Another cam 73 may operate a switch 81 for a selector relay 82 which is also controlled through the speed reducer 74 by means of a cam 83 and a switch 84. Controlled by this selector relay is a solenoid 85 for operating a valve 86 for the shutter A and a solenoid 87 for operating the valve 88 for the shutter B.

As represented by Figs. 5 to 12, there are four valve structures 77, 80, 86, and 88, each having a connection to a high-volume low-pressure air supply line 89 and another connection to a vacuum line 90.

The valve 86 has a connector 91 for subjecting the tube 55 for the shutter A selectively to pressure and vacuum, and the valve 88 has a connector 92 for subjecting the tube 56 for the shutter B selectively to vacuum and pressure. Thus each of the shutters may be moved selectively to open or closed position depending upon whether it is subjected to pressure or vacuum.

Each of the valves is diagrammatically represented as including a slide having ports which are adapted to occupy positions of registration and nonregistration relative to fixed ports in the valves to establish and shut off the various flow connections referred to above.

The valve 77 has a two-ported slide 93 which in one position (Figs. 5 and 9) connects the tubes 40 and 47 to the pressure and vacuum lines 89 and 90, respectively, and in its other position (Figs. 6, 7, 8, 10, 11 and 12) opens said tubes to atmosphere.

The valve 80 has a three-ported slide 94 which in one position (Figs. 5, 6, 8, 9, 10 and 12) connects the tube 46 to the vacuum line 90 and opens the tubes 39 and 48 to the atmosphere, and in its other position (Figs. 7 and 11) opens the tube 46 to atmosphere and connects the tubes 39 and 48 to the respective pressure and vacuum lines 89 and 90.

The valve 86 has a two-ported slide 95 which in one position (Figs. 5 to 9) connects the tube 55 to the pressure line 89 and in the other position (Figs. 10 to 12) connects the tube to the vacuum line 90.

The valve 88 has a two-ported slide 96 which in one position (Figs. 5 and 9 to 12) connects the tube 56 to the suction line 90 and in the other position (Figs. 6 to 8) connects the tube to the pressure line 89.

Any valve structure in which the movable part is capable of rapid movement may be used. In practice, a valve slide has been quite satisfactory as it may be rapidly moved in one direction by a solenoid controlled by a switch and moved in the other direction by another solenoid or by a spring connection which quickly and positively returns the slide. The cams 71, 72 and 73 are of suitable shapes and are usually actuated by a motor 67 to produce a predetermined and timed operation of the valves to produce the sequence of operations as represented, for example, in Figs. 5 to 12 inclusive.

In operation of the camera, there are made available to the valves through the lines 89 and 90 high volume low pressure and vacuum of about 2½ p.s.i. to reduce the effects of air leakage.

Figure 1:
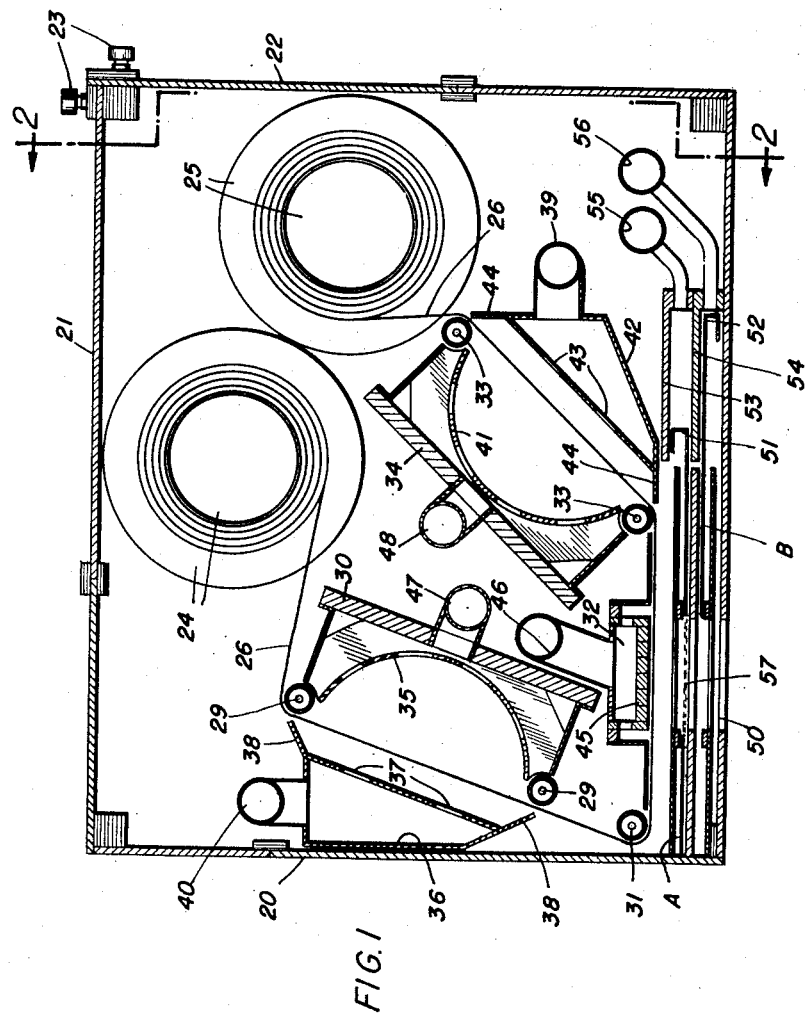
Fig. 1 is a sectional view as taken on the line 1—1 of Fig. 2 of a film-transport mechanism in accordance with this invention as applied to an aerographic film camera.

Fig. 1 shows the shutters A and B and the film 26 in the positions they might occupy immediately after threading.

Let us consider a cycle of operation to begin with the parts arranged as shown in Fig. 5, and consider that the film backing device 32 is under suction and thus holds a film portion Exp. 1 in focal position, the slide of the valve 77 has just shifted so that the supply film looping device 30 is subject to pressure and vacuum and forms a film loop, the film advancing device 34 is open to atmosphere and the film portion therein is straight, the shutter B is under suction and is therefore open, and the shutter A is under pressure and is therefore open, so that the film portion Exp. 1 is exposed and has just become exposed.

All times given in this discussion of the cycle are elapsed times from the beginning of the cycle.

At 0.30 second, the slides of the valves 77 and 88 shift, the other two valve slides remaining stationary, so that the parts are then arranged as shown in Fig. 6, wherein the only changes from Fig. 5 reside in that the supply film looping device 30 is opened to atmosphere and the shutter B has been placed under pressure and is therefore closed, terminating exposure of Exp. 1.

At 0.31 second, the slide of the valve 80 is shifted, the other valve slides remaining stationary, so that the parts are arranged as shown in Fig. 7, wherein the only changes from Fig. 6 reside in that the backing device 32 has just been opened to atmosphere so that the film portion Exp. 1 is released therefrom, and the advancing device 34 has just been subjected to pressure and vacuum so that a loop is formed therein by taking up the slack in the supply loop previously existing in the device 30 and advancing the next film portion Exp. 2 into spaced confronting relation to the backing device 32.

At 0.39 second, the slide of the valve 80 shifts, the other valve slides remaining stationary, so that the parts are arranged as shown in Fig. 8, wherein the only changes from Fig. 7 reside in that the backing device 32 has been placed under suction so that it holds the film portion Exp. 2 in focal position, and the film-advancing device 34 has just been opened to atmosphere, allowing the take-up reel 25 to commence to straighten the loop in the device 34, as noted in connection with Fig. 9.

At 0.40 second, the slides of the valves 77 and 88 shift, the other valve slides remaining stationary, so that the parts are arranged as shown in Fig. 9, wherein the only changes from Fig. 8 reside in that the supply-looping device 30 has just been subjected to suction and pressure so that a film loop is formed therein from the supply reel 24, the take-up reel 25 has straightened the loop previously existing in the device 34, and the shutter B has just been subjected to suction and therefore opened, so that the film portion Exp. 2 has just become exposed.

At 0.70 second, the slides of the valves 77 and 86 are shifted, the other valve slides remaining stationary, so that the parts are arranged as shown in Fig. 10, wherein the only changes from Fig. 9 reside in that the device 30 is opened to atmosphere, and the shutter A has just been subjected to suction and is therefore closed, terminating exposure of Exp. 2.

Figure 11:
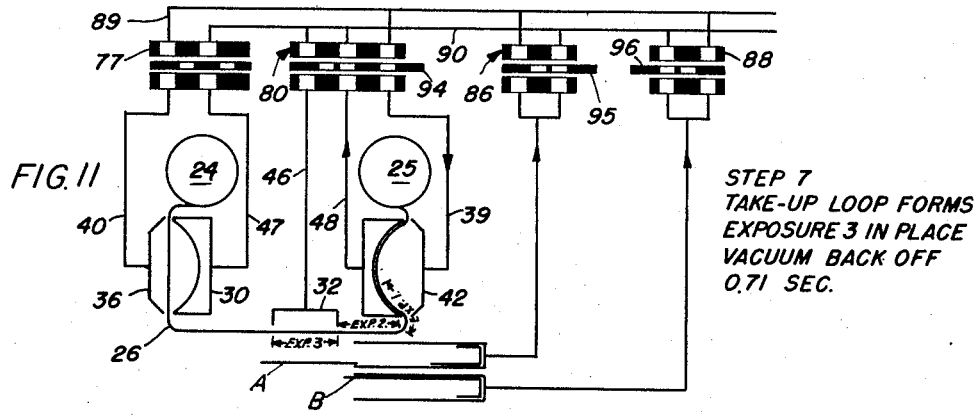

At 0.71 second, the slide of the valve 80 shifts, the other valve slides remaining stationary, so that the parts are arranged as shown in Fig. 11, wherein the only changes from Fig. 10 reside in that the device 32 has just been opened to atmosphere, releasing the film portion Exp. 2, and the device 34 has just been subjected to pressure and vacuum so that a loop is formed therein by taking up the slack in the loop previously existing in the device 30 and advancing the film to place the next film portion Exp. 3 in spaced confronting relation to the device 32.

Figure 12:
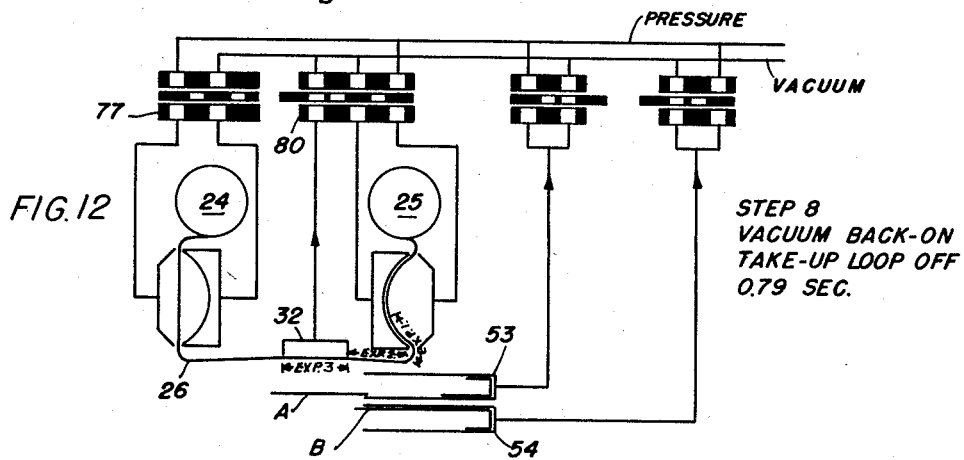

At 0.79 seconds, the slide of the valve 80 shifts, the other valve slides remaining stationary, so that the parts are arranged as shown in Fig. 12, wherein the only changes from Fig. 11 reside in that the backing device 32 has just been connected to suction and therefore holds the film portion Exp. 3 in focal position, and the device 34 is open to atmosphere, allowing the take-up reel 25 to commence to straighten the loop in the device 34.

At 0.80 second, the slides of the valves 77 and 86 shift, the other valve slides remaining stationary, so that the parts have just become arranged as shown in Fig. 5, commencing exposure of the film portion Exp. 3, thus completing a camera cycle accounting for two complete exposures in substantially less than one second.

In a complete cycle of operation, the take-up reel 25 which may be driven through a slip clutch connection winds the film in one direction, and the ratchet wheel 64 and its pawl 65 prevent the film and the take-up reel 25 from being pulled in reverse direction during the pneumatic film advance cycle. At the end of the cycle as above set forth, the cycle may be repeated for as many exposures as desired.

Although this device is particularly explained in connection with a film-handling magazine camera, the principle involved may be applied to a similar pneumatic movement of other strip material, as for printing or for successive application of adhesive labels.

With the structure thus far described it will be observed that the length of film advanced in each step is the difference in length between the loop and its chord.

Fig. 13 shows how the length of film transported in each advance may be increased or reduced. To this end there is provided a suction receptacle 98 connected to the suction duct 47 and containing an arcuate perforated guide 99 (which is longer than the guide 35 above described) for the film 100, and guide rollers 101 and 102 at the ends of the guide. Associated with the receptacle 98 is a complemental air pressure receptacle 102, connected to the air pressure duct 40.

The receptacle 102 may be provided with a flat perforated guide a, and the length of film advanced each time will of course be the difference in length between the loop defined by the guide 99, and the chord of the loop.

To obtain a shorter advance, the receptacle 102 is provided with an arcuate perforated guide b or c of less curvature than the guide 99, the advance being the difference between the arcuate length of the guide 99 and the arcuate length of the guide b or c, as the case may be.

A further modified film looping device is shown in Fig. 14, in which, instead of being arcuately looped, the film when looped is substantially angular. To this end, in addition to a vacuum receptacle 103, a pressure receptacle 104 and guide rollers 105 for the film 106, there is provided a piston 107 located in the receptacle 103 and having a flat head, perforated at 108, for engaging and shaping the bight of the film loop, the walls of the receptacle 103 adjacent the piston head being straight and serving to guide and shape the arms of the film loop between the rollers 105. When subjected to vacuum, the piston head will occupy the dotted line position to define the loop.

Fig. 15 shows the same arrangement as Fig. 14 except that a shallower perforated piston 109 is employed to obtain a deeper and therefore longer loop so that a greater length of film will be progressed or transported in each advance.

If desired, using either the piston 107 or the piston 109, various stops may be disposed within the receptacle 103 to vary the limit of inward movement of the piston.

It is thus apparent that a film advance of the desired length may be readily obtained.

While preferred embodiments have been described in some detail, they should be regarded as examples of the invention and not as restrictions or limitations thereof, as many changes may be made in the construction and arrangement of the parts without departing from the spirit and scope of the invention.

I claim:

1. Photographic apparatus, comprising a film supply reel, a film takeup reel, a film backing intermediate said reels, a first pair of mutually spaced receptacles between said supply reel and said backing, a second pair of mutually spaced receptacles between said takeup reel and said backing, one receptacle of each pair including a concave surface between which and the other receptacle the film is adapted to pass, said surface communicating with the interior of said one receptacle, a pair of shutters between which and said backing the film is adapted to pass, an air pressure line, a vacuum line, means for selectively connecting said one receptacle of each pair to vacuum or atmosphere, said other receptacle of each pair to pressure or atmosphere, said backing to vacuum or atmosphere, and each of said shutters to pressure or vacuum, one of said shutters being open when connected to pressure and closed when connected to vacuum, the other shutter being closed when connected to pressure and open when connected to vacuum, and means for so cycling the operation of said connecting means that when the second pair of receptacles are connected to atmosphere and said backing is connected to vacuum, the receptacles of the first pair are respectively connected to pressure and vacuum so as to advance sufficient film from said supply reel to depress the film into a loop in the associated concavity, and when the first pair of receptacles and said backing are next connected to atmosphere, the receptacles of said second pair are respectively connected to pressure and vacuum so as to contract said loop and, to the extent of such contraction, advance the film and depress the film into a loop in the concavity associated with the second pair, and said shutters are in open position only while said backing is connected to suction, and means for advancing said takeup reel, when said second pair of receptacles is next connected to atmosphere while said backing is connected to vacuum, to contract the second loop to the aforesaid extent.

2. Photographic film advancing apparatus, comprising a film supply reel, a film takeup reel, a film backing intermediate said reels, a first pair of mutually spaced receptacles between said supply reel and said backing, a second pair of mutually spaced receptacles between said takeup reel and said backing, one receptacle of each pair including a concave surface communicating with the interior of said one receptacle, an air pressure line, a vacuum line, means for selectively connecting said one receptacle of each pair to vacuum or atmosphere, said other receptacle of each pair to pressure or atmosphere, and said backing to vacuum or atmosphere, and means for so cycling the operation of said connecting means that when the second pair of receptacles are connected to atmosphere and said backing is connected to vacuum, the receptacles of the first pair are respectively connected to pressure and vacuum so as to advance sufficient film from said supply reel to depress the film into a loop in the associated concavity, and when the first pair of receptacles and said backing are next connected to atmosphere, the receptacles of said second pair are respectively connected to pressure and vacuum so as to contract said loop and, to the extent of such contraction, advance the film and depress the film into a loop in the concavity associated with the second pair, and means for advancing said takeup reel, when said second pair of receptacles is next connected to atmosphere while said backing is connected to vacuum, to contract the second loop to the aforesaid extent.

3. Photographic film advancing apparatus, comprising a film supply reel, a film takeup reel, a film backing intermediate said reels, a first pair of mutually spaced receptacles between said supply reel and said backing, a second pair of mutually spaced receptacles between said takeup reel and said backing, one receptacle of each pair including an arcuately concave surface communicating with the interior of said one receptacle, an air pressure line, a vacuum line, means for selectively connecting said one receptacle of each pair to vacuum or atmosphere, said other receptacle of each pair to pressure or atmosphere, and said backing to vacuum or atmosphere, and means for so cycling the operation of said connecting means that when the second pair of receptacles are connected to atmosphere and said backing is connected to vacuum, the receptacles of the first pair are respectively connected to pressure and vacuum so as to advance sufficient film from said supply reel to depress the film into a loop in the associated concavity, and when the first pair of receptacles and said backing are next connected to atmosphere, the receptacles of said second pair are respectively connected to pressure and vacuum so as to contract said loop and, to the extent of such contraction, advance the film and depress the film into a loop in the concavity associated with the second pair, and means for advancing said takeup reel, when said second pair of receptacles is next connected to atmosphere while said backing is connected to vacuum, to contract the second loop to the aforesaid extent.

References Cited in the file of this patent

UNITED STATES PATENTS

| | | |
|---|---|---|
| 287,858 | Perry | Nov. 6, 1883 |
| 340,213 | Hoedemaker et al. | Apr. 20, 1886 |
| 1,082,678 | Casler | Dec. 30, 1913 |
| 1,181,201 | Akeley | May 2, 1916 |
| 1,309,471 | Evans | July 8, 1919 |
| 2,225,832 | Holbrook | Dec. 24, 1940 |
| 2,601,347 | Waller | June 24, 1952 |
| 2,731,893 | Kling et al. | Jan. 24, 1956 |
| 2,747,457 | Wengel | May 29, 1956 |

FOREIGN PATENTS

| | | |
|---|---|---|
| 576,764 | Great Britain | Apr. 17, 1946 |
| 701,850 | Great Britain | Jan. 6, 1954 |